US 7,062,455 B1

(12) United States Patent
Tobey

(10) Patent No.: US 7,062,455 B1
(45) Date of Patent: Jun. 13, 2006

(54) METHOD AND SYSTEM FOR TRACKING COMPUTER HARDWARE AND SOFTWARE ASSETS BY ALLOCATING AND TAGGING THE ASSET WITH AN ASSET TAG BARCODE HAVING A SOFTWARE DISTRIBUTION SYSTEM (SDS) NUMBER AND VERIFYING THE ASSET TAG BARCODE UPON ENTRY OF THE ASSET AT A DESTINATION SITE

(75) Inventor: Christopher Lee Tobey, Mosman (AU)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 09/657,039

(22) Filed: Sep. 7, 2000

(51) Int. Cl.
*G06F 17/60* (2006.01)

(52) U.S. Cl. .............................. 705/28; 705/7; 705/22; 700/115; 235/385

(58) Field of Classification Search ................ 705/7–9, 705/22, 28, 36, 2–3; 700/214, 213, 115; 235/385
See application file for complete search history.

(56) References Cited

U.S. PATENT DOCUMENTS

| | | | | | |
|---|---|---|---|---|---|
| 4,141,078 | A | * | 2/1979 | Bridges et al. ............. 235/375 |
| 4,153,931 | A | * | 5/1979 | Green et al. .............. 707/104.1 |
| 4,636,950 | A | * | 1/1987 | Caswell et al. ................ 705/28 |
| 5,288,980 | A | * | 2/1994 | Patel et al. .................. 235/381 |
| 5,289,372 | A | * | 2/1994 | Guthrie et al. ................ 705/28 |
| 5,424,944 | A | * | 6/1995 | Kelly et al. .................... 705/28 |
| 5,434,775 | A | * | 7/1995 | Sims et al. ...................... 705/8 |
| 5,455,409 | A | * | 10/1995 | Smith et al. ................. 235/385 |
| 5,662,048 | A | * | 9/1997 | Kralj et al. ................. 108/56.3 |
| 5,848,421 | A | * | 12/1998 | Brichta et al. .............. 707/200 |
| 5,856,931 | A | * | 1/1999 | McCasland .................. 702/182 |
| 5,878,416 | A | * | 3/1999 | Harris et al. .................. 707/10 |
| 5,918,191 | A | * | 6/1999 | Patel ............................ 702/84 |
| 5,949,335 | A | * | 9/1999 | Maynard ................. 340/572.1 |
| 6,057,779 | A | * | 5/2000 | Bates ........................ 340/5.21 |
| 6,220,768 | B1 | * | 4/2001 | Barroux ...................... 709/224 |
| 6,237,051 | B1 | * | 5/2001 | Collins ........................ 710/36 |
| 6,249,227 | B1 | * | 6/2001 | Brady et al. ............. 340/572.1 |

(Continued)

FOREIGN PATENT DOCUMENTS

JP 2000194751 A * 7/2000

OTHER PUBLICATIONS

PALM User's Manual, Sep. 1989.*

(Continued)

*Primary Examiner*—Joseph Thomas
*Assistant Examiner*—Carolyn Bleck
(74) *Attorney, Agent, or Firm*—Schmeiser, Olsen & Watts; William H. Steinberg

(57) ABSTRACT

A method and apparatus for tracking physical assets between a central site and other sites is disclosed. Assets are received at the central site and receive a unique identification number. Their location, at the central site, is recorded in a database. On each movement of an asset, exit of the asset is recorded in the database, as is the intended destination. When the asset arrives at the intended destination, its entry thereto is verified and its current location updated accordingly. In addition to the location information, configuration information (e.g. software build), specific to each asset, is recorded in the database.

31 Claims, 6 Drawing Sheets

U.S. PATENT DOCUMENTS

| | | | | |
|---|---|---|---|---|
| 6,392,543 | B1* | 5/2002 | Maloney | 340/568.1 |
| 6,421,571 | B1* | 7/2002 | Spriggs et al. | 700/17 |
| 6,578,013 | B1* | 6/2003 | Davis et al. | 705/26 |
| 6,614,349 | B1* | 9/2003 | Proctor et al. | 340/572.1 |
| 6,640,246 | B1* | 10/2003 | Gary et al. | 709/223 |
| 6,650,346 | B1* | 11/2003 | Jaeger et al. | 715/764 |
| 6,650,622 | B1* | 11/2003 | Austerman et al. | 370/241 |
| 6,721,617 | B1* | 4/2004 | Kato et al. | 700/115 |
| 2002/0008621 | A1* | 1/2002 | Barritz et al. | 340/572.1 |

OTHER PUBLICATIONS

Managing IT resources with an agent, The Jakarta Post, Jakarta: Dec. 21, 1998. p. 1.*

Cofix Unveils Free Online Solution to Help Businesses Manage IT Assets, Identify Optimal IT Service Providers, PR Newswire, New York: May 19, 2000. p. 1.*

Janus extends asset management capabilities with new Tivoli interface, Monica Simms, Wall Street & Technology. New York: Jul. 1999. vol. 17, Iss. 7; p. 22 (1 page).*

* cited by examiner

METHOD AND SYSTEM FOR TRACKING COMPUTER HARDWARE AND SOFTWARE ASSETS BY ALLOCATING AND TAGGING THE ASSET WITH AN ASSET TAG BARCODE HAVING A SOFTWARE DISTRIBUTION SYSTEM (SDS) NUMBER AND VERIFYING THE ASSET TAG BARCODE UPON ENTRY OF THE ASSET AT A DESTINATION SITE

TECHNICAL FIELD OF THE INVENTION

The present invention relates generally to tracking assets and, in particular, to tracking computer-related assets which are to be used at a plurality of venues.

BACKGROUND ART

As computer technology has developed, an increasing number of activities have become dependent on computer systems to capture, process and distribute data. The more computer systems are used, the more important it becomes, financially and logistically, to manage their distribution and functionality.

One example of an event requiring the provision of computer facilities at multiple locations is the Olympic Games. Computers will be used to support many tasks including accreditation, staff rostering, registration of staff and volunteers, capturing results and distributing results. Network links between computer systems will enable rapid diffusion of information. As computers at different locations will perform different tasks, each computer should be uniquely configured to match its intended use. Equipment that is no longer required at a given venue may be redeployed for use other locations.

Organisations like Banks also depend on a large number of computers distributed at multiple locations. ATMs and teller machines provide an interface with bank customers, and these are linked to a network of in-house computing systems which track all financial transactions. For maintenance and asset-management purposes, it is important to know what computer hardware and software is situated at each location.

Warehousing systems are known for tracking assets within manufacturing and retail facilities. In these warehousing systems the location of goods is tracked from arrival at a storage facility until the time those goods are sold or are removed from the storage facility for any other reason, such as inclusion in a manufactured product. Beyond the warehouse doors, however, no account is kept of the assets' location.

SUMMARY OF THE INVENTION

It is an object of the present invention to substantially overcome, or at least ameliorate, one or more disadvantages of existing arrangements.

The invention discloses a method for tracking physical assets, the assets being moveable between a plurality of sites, the method comprising the steps of:
receiving a new asset at a central site;
assigning a unique identifier to each said asset;
recording the location of said asset with respect to said central site in a database; and
on each movement of a said asset:
recording exit of the asset from the current site in said database;
recording the intended destination site in said database; and
verifying entry of the asset at the destination site, being the new current location, in said database.

The invention further discloses a method for tracking physical assets, the assets being movable only between a central site and a plurality of other sites, the method comprising the steps of:
receiving a new asset at a central site;
assigning a unique identifier to each said asset;
recording the location of said asset with respect to said central site in a database; and
on each movement of a said asset:
recording exit of the asset from the current site in said database;
recording the intended destination site in said database; and
verifying entry of the asset at the destination site, being the new current location, in said database;
recording exit of the asset from the current site in said database
recording the intended destination site in said database; and
verifying entry of the asset at the destination site, being the new current location, in said database;

The invention further discloses a tracking system for assets that are movable between a plurality of sites, comprising:
an electronic database for storage of current and intended location information relating to said assets; and
a central receiving and storage site where new assets are received and stored, and where assets returning from other sites are stored, said central site having data entry means, linked to said database in which a unique identifier assigned to each said asset is stored and, upon a movement of a said asset, by which exit or entry of the asset is recorded such that both the respective current and intended location information is updated in said database.

The invention yet further discloses a tracking system for assets that are movable between a plurality of sites, comprising:
an electronic database for storage of current and intended location information relating to said assets; and
a central receiving and storage site where new assets are received and stored, and where assets returning from other sites are stored, said central site having data entry means, linked to said database in which a unique identifier assigned to each said asset and configuration information of each said asset is stored and, upon a movement of a said asset, by which exit or entry of the asset is recorded such that both the respective current and intended location information is updated in said database.

The invention yet further discloses a computer program product, carried on a storage medium, for the tracking of physical assets, between a central site and a plurality of other sites, comprising:
first program means to record a unique identifier for each said asset;
second program means to record the location of an asset;
third program means to record exit from a current site;
fourth program means to record an intended destination; and
fifth program means to verify entry of an asset being moved at the destination site, whereupon said second program means updates the current location of the asset.

BRIEF DESCRIPTION OF THE DRAWINGS

A number of preferred embodiments of the present invention will now be described with reference to the drawings, in which.

DETAILED DESCRIPTION INCLUDING BEST MODE

The principles of the preferred embodiment described herein have general applicability to any system where assets are distributed across multiple venues. However, for ease of explanation, the steps of the preferred method are described with reference to the distribution of hardware and software assets to venues where Olympic Games events are being held. It is not intended that the present invention be limited to the described method. For example, the invention may have application to Banks, where computer-related assets are moved between multiple locations, or large retailing systems, where there are many point of sale terminals.

By way of further background, the Sydney Olympic Games in the year 2000 involves about thirty competition and an equal number of non-competition venues. The computing equipment being installed at the venues is in the order of tens of thousands of items, having a value in excess of US$30 million.

Figure 1:
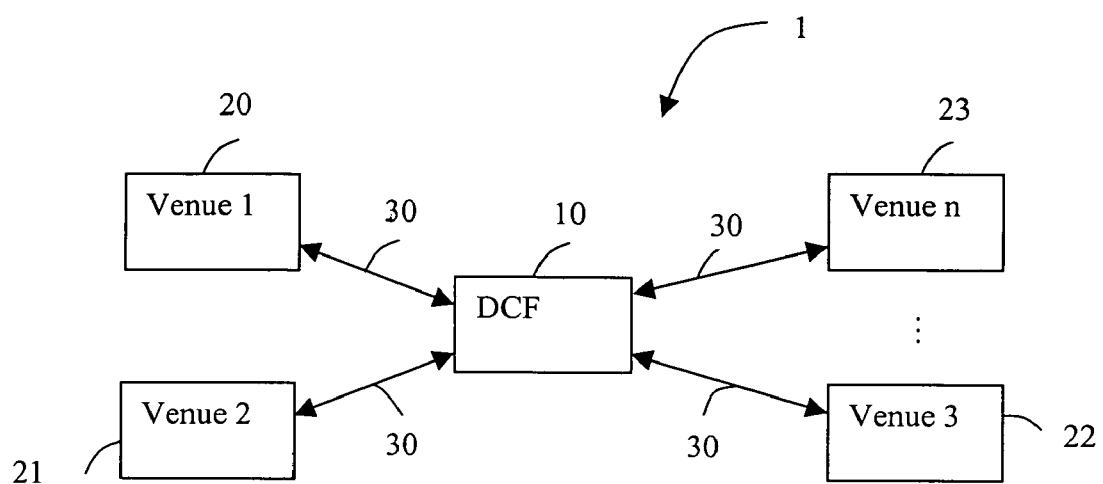
FIG. 1 shows the geographic distribution of the computer-related assets.

FIG. 1 shows a system in which computer-related assets are to be provided at N different venues 20–23. In the context of the Olympic Games, the first venue 20 might be the Aquatics Centre, while the second venue 21 could be the Beach Volleyball Stadium. A considerable amount of hardware and software is required at each of these venues and the total number of asset movements is expected to exceed 150,000 for the Sydney Olympic Games.

Also shown in FIG. 1 is a Device Configuration Facility (DCF) 10. The DCF 10 is the initial entry point for all computer-related assets to be used in the system 1. The DCF 10 comprises warehouse facilities where individual items may be stored until they are required. The DCF 10 also comprises a build facility where component items may be assembled into the computer systems required at the venues 20–23. In a preferred embodiment, the warehouse facility and the build facility are provided in the same building complex, while in alternative embodiments the warehouse and the build facility may be in different locations.

The links 30 illustrate the movement of assets within the system 1. The DCF 10 acts as a central hub from which assets are moved to each venue 20–23. When an asset is no longer required at a particular venue 20–23 it may be returned to the DCF 10, where it may either be stored, or sent to another venue. Assets are always routed through the DCF 10, and never move directly from venue to venue.

Figure 2:
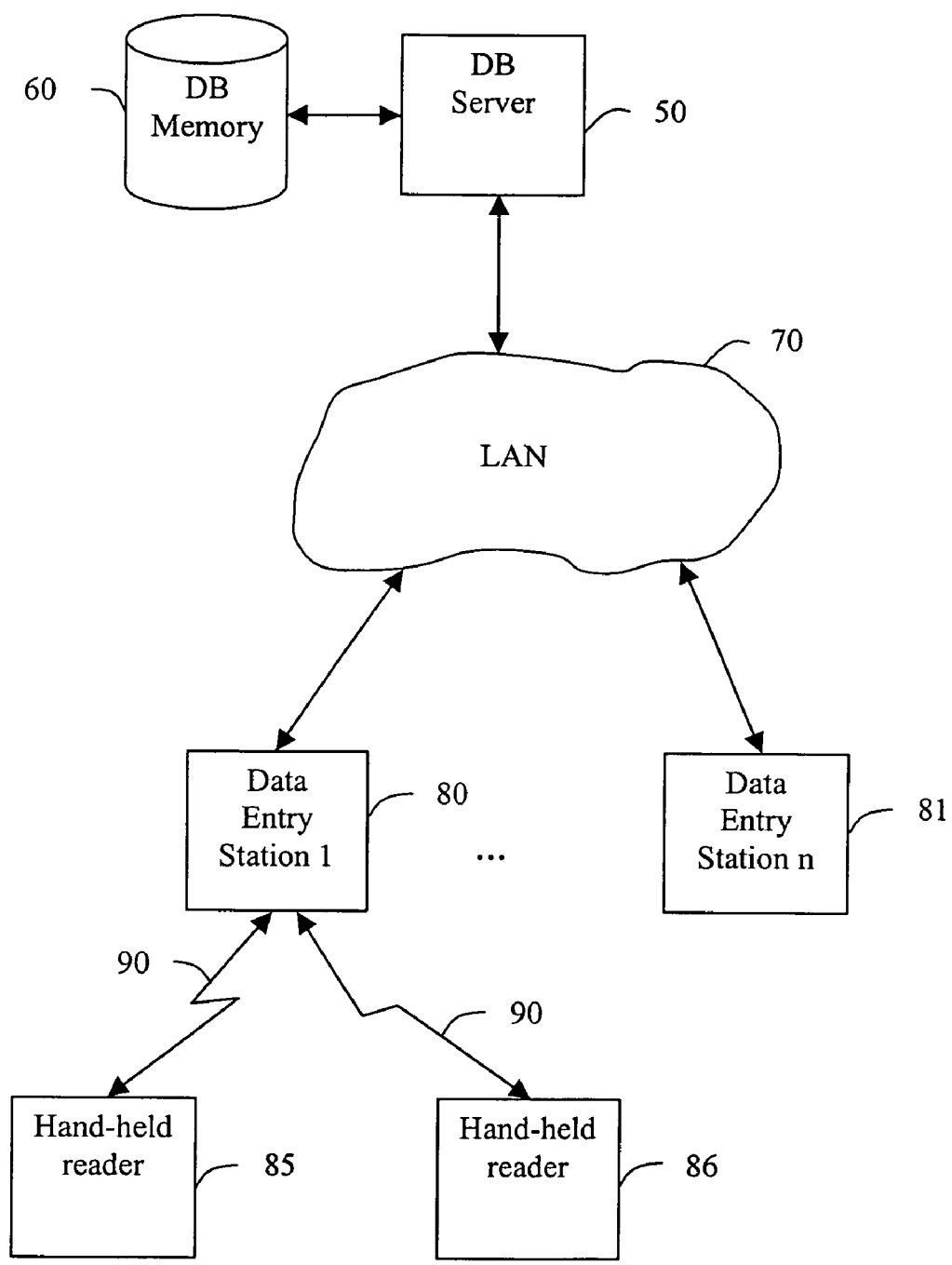
FIG. 2 is a schematic diagram of a computer system that may be used in the Device Configuration Facility of FIG. 1.

FIG. 2 shows a preferred computer infrastructure used at the DCF 10 to support the database of tracked assets. The database is stored in a memory 60 connected to a database server 50. N data entry stations 80–81 communicate with the database server 50 via a local area network (LAN) 70. Database entries may be read or entered at the data entry stations 80–81, or they may be captured by hand-held readers 85–86. The hand-held readers 85–86 are generally used to read information stored in barcodes or other indicia associated with the assets. The information gathered by the hand-held readers 85–86 is transmitted to the rest of the system by means of links 90 which may be either cables or wireless radio-frequency links. The infrastructure shown in FIG. 2 may be used to run warehouse management software such as MARC_CS™, which is an industry standard available from MARC Systems, a product division of TRW Global Enterprise Solutions, of Cleveland Ohio. MARC-CS™ is an open system which supports multiple platforms on the Oracle™ RDBMS and provides links to other database systems such as SAP R/3™, BAAN™, and QAD™. Further information may be found at www.trw.com.

The DB server 50 and memory 60 can run under any SQL-type, with data updates through MARC. The entire software infrastructure can be supported by any convenient operating system such as UNIX™ or WindowsNT™. The software used comprises standard MARC™ features with the addition of a number of back-end SQL routines, which enable capture of the Software Distribution System (SDS) number, production of delivery reports and extraction of information for ad-hoc reporting through COGNOS™. These added capabilities include a history of item movements.

Figure 3:
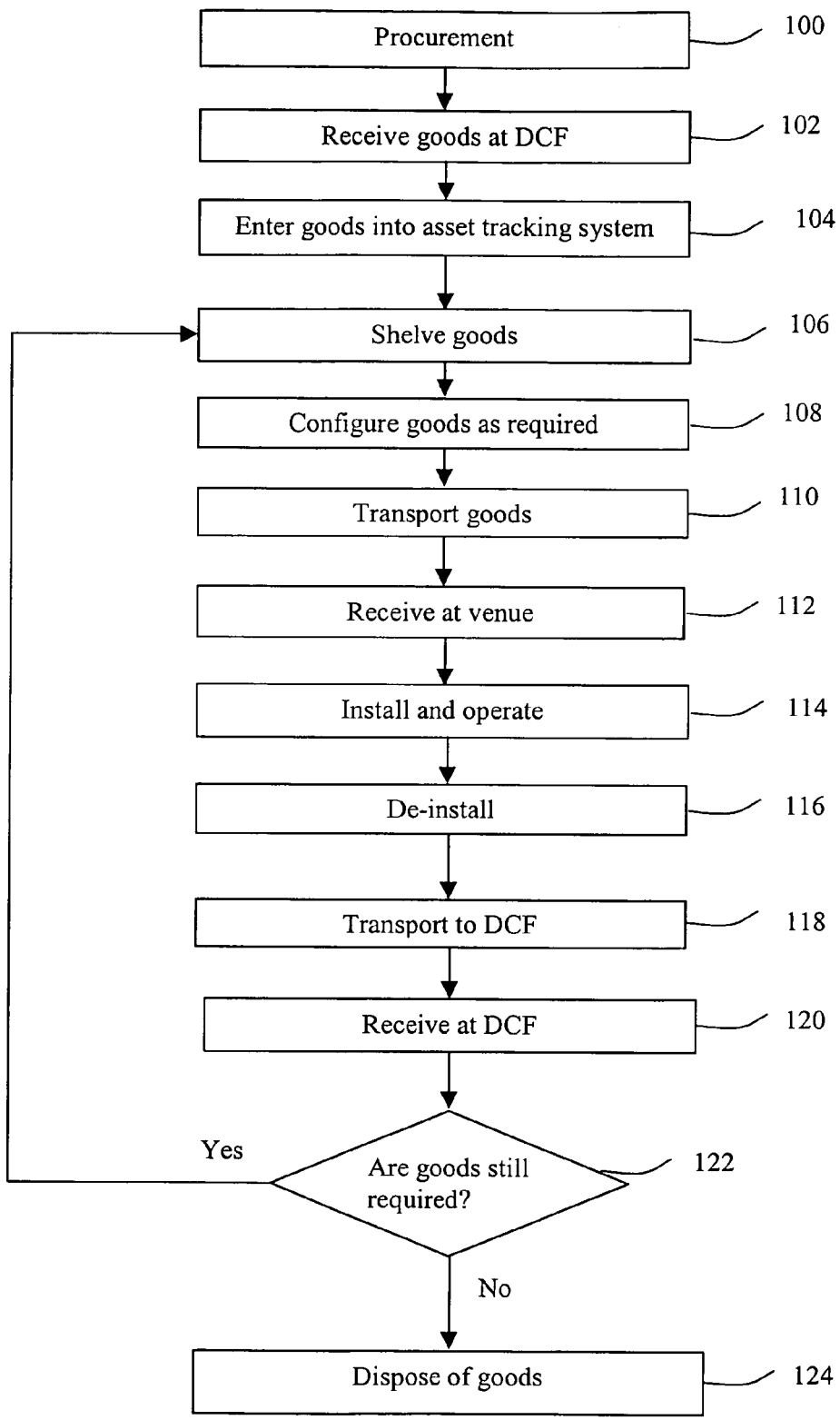
FIG. 3 is a flow diagram describing the flow of the assets through the tracking system.

FIG. 3 shows a flow diagram which illustrates the movement of assets through the tracking system.

In step 100 the goods are procured. This step comprises the sub-steps of determining the hardware and software requirements at each of the venues 20–23, preparing a Bill of Materials (BOM) and ordering the equipment subject to financial and managerial approval.

In step 102 the goods are received at the DCF Receiving Dock. An inventory manager will validate a manifest against the order. In the next step 104 of the process, the goods are entered into the Asset Tracking System. The Asset Tracking System will be described in more detail below with reference to FIG. 4.

Following entry into the Asset Tracking System, in step 106 the goods are shelved within the warehousing facility. Conventional warehousing software such as MARC-CS may be used to determine the location of assets within the warehousing facility. With additional modifications, the software may indicate, for example, whether the assets are located at a venue, in the build facility, in transit, or are stored in a particular slot in the warehouse. In a preferred embodiment, all equipment is labelled with machine-readable indicia such as barcodes. These indicia may be easily read by hand-held or fixed reading equipment, allowing efficient tracking of the assets.

In step 108 the hardware and software assets are configured according to the specifications determined for each venue 20–23. To perform this configuration step 108, the necessary hardware and software is retrieved from its location within the warehouse and is delivered to a build facility which forms part of the DCF 10. If desired, only the PC is stored in the warehouse, while a supply of monitors, cables, keyboards and mice may be kept at the build facility. A build team updates the warehouse logistics software, attaches cables to the PCs and begins the software build process. The initialisation may be done using a Compact Disk, a diskette, or a network connection to a local Tivoli or CID server. The build team then prints appropriate labels for the equipment, affixes the label to the PC being built, repacks the PC in its original carton, and places a packet of matching labels on the outside of the carton. The labelling is described in more detail below with reference to FIG. 4. A kitting team then gathers further equipment such as monitors and cables which needs to be packaged together with the PC, attaches labels to this further equipment, and bundles it all as one unit. The unit is shrink-wrapped and placed on a pallet with other units which are destined for the same venue. Groups of such pallets are identified within the warehouse system as a "lot", and can be picked and delivered as a complete "lot" to a venue location.

When the transport has been scheduled, the configured goods are queued on the loading dock, and in step 110 the goods are delivered to the venue. In a preferred embodiment, the goods are delivered in a point-to-point fashion, i.e. the truck conveys the goods to a single destination. This reduces the possibility that goods might be delivered to the incorrect venue. When a single truck delivers a range of goods to a series of destinations in a single trip, the offloading becomes more complex, and the possibility of errors is increased.

In step 112 the goods are received at the venue. The process of delivery and reception will be described below in more detail with reference to FIG. 5.

Once at the venue, the goods are installed in the desired location, where they operate until no longer required at that venue. Once the equipment is no longer required at the venue, it is de-installed (step 116). The equipment is packaged and transported back to the DCF 10 (step 118). The method steps summarised in 116 to 120 will be described in greater detail below with reference to FIG. 6.

Once the equipment has been returned to DCF 10, there is a decision step 122. If the goods are still required for use at other venues, the method returns to step 106 and the goods are re-shelved. The remaining steps of the process may then be repeated as often as required.

If the goods are returned to the DCF 10 and it is ascertained that there is no further need for them, they are disposed of in step 124. In the case of the Olympic Games, the hardware and software equipment is only required during a lead-up, and for the duration of events at the Games. As this is a fairly short period of use, the equipment should be in good working order and may therefore be used in other applications. In general, it is possible that the disposal of equipment 124 will only take place when the goods are antiquated or are due to be replaced by newer equipment. The disposal step 124 will thus take different forms for different equipment, and could involve re-sale, redeployment or scrapping.

Figure 4:
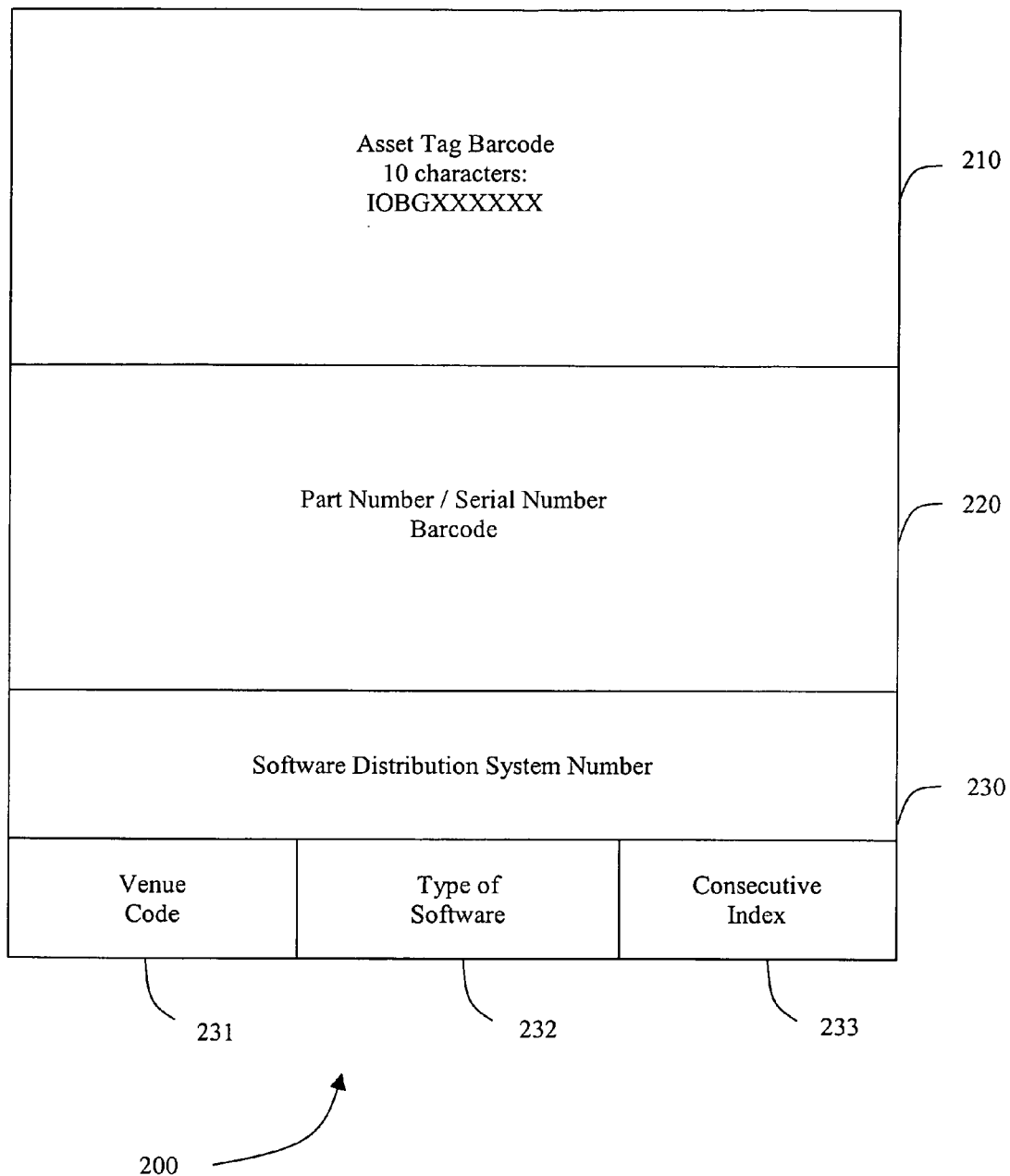
FIG. 4 shows the labelling system used to identify the assets.

FIG. 4 illustrates a preferred embodiment of a labelling system used in tracking control of tagged assets. A tag 200 comprises three main parts: an asset tag barcode 210, a part number or serial number barcode 220, and a Software Distribution System number 230. Preferably, the date on which the asset was built is also indicated on the label.

The asset tag barcode 210 comprises ten characters and is printed on durable secure tags, as the barcode 210 is transported together with the goods. The part number or serial number 220 is a number that a manufacturer associates with a piece of equipment. The Software Distribution System number 230, on the other hand, is defined within the asset tracking system 1. In a preferred embodiment the number 230 comprises eight characters. The first three define a venue code 231, in which, by way of example, OST might indicate the Olympic Stadium. The following group of two hexadecimal characters 232 designates the type of software, 1A, for example, might indicate a Results Server.

The following two characters list the consecutive number of the software and thus make the Software Distribution System number 230 unique for each software unit at a venue. The venue code 231 specifies which of the venues 20–23 is the destination for the particular piece of equipment.

In order to receive equipment at the DCF 10, a Purchase Order (PO) must be generated. The Purchase Order will distinguish whether the equipment is a new product, a product returned from a venue 20–23, or a product returned from the Build Centre. A new order is given the code NW, an order returned from a venue is designated VN while a configured order returned from the build centre is given the code CF.

When receiving equipment it is necessary to capture the asset number of the asset tag barcode 210 and the SDS number 230. For new product (code NW) the asset number must be recorded and an SDS number allocated. For all other equipment (codes CF or VN) the SDS number must be captured.

Table 1 shows a portion of a representative asset listing. The five columns shown contain the Venue Code, the Part/Serial number, the Asset number, the Software Distribution System (SDS) number and the Stock Keeping Unit (SKU) number. Table 1 does not show the remaining fields used in the database. These fields include the bin location, which is a barcode identifying a shelf location for each pallet in the warehouse, and the license plate, which identifies a pallet for each item. A lot number associates the pallet with a "lot" as described above, and information regarding size and weight of an item is stored, allowing the system to determine what empty bins or slots can take the equipment and how many items will go on a pallet. The item's arrival date is stored, and stock is rotated by arrival date so that the first stock received is not left on the shelf for longer periods. A further field records the stock disposition, ie whether the item is New, Configured or At Venue. Cyclical stocktaking information is stored and is used to provide checks and balances.

Importantly, the database is adapted to store historical information and thus records the path followed by each asset. This could indicate, for example, a) into warehouse, b) transfer to build centre, c) transfer from build centre to warehouse, d) transfer to venue, e) receipt from venue, f) back into warehouse, etc.

TABLE 1

Portion of asset database

| Venue | Part/Serial Number | Asset number | SDS number | SKU number |
|---|---|---|---|---|
| AQR | 06012C782A550875M | IOBG003008 | BBV1301 | 012C782 |
| AQR | 06012C782A550866C | IOBG003006 | BBV1302 | 012C782 |
| AQR | 06012C782A550872N | IOBG003252 | BBV9F01 | 012C782 |
| AQR | 06012C782A550856T | IOBG003397 | BBV1402 | 012C782 |
| AQR | 06012C782A550853B | IOBG004102 | BBV9401 | 012C782 |
| AQR | 06012C782A550861K | IOBG003069 | BBV9402 | 012C782 |
| AQR | 06012C782A550881X | IOBG003602 | BBV1401 | 012C782 |
| AQR | 06012C782A550857X | IOBG003421 | BBV9301 | 012C782 |

The labelling system described above specifies both the function and intended destination of the equipment stored in the warehouse facility of the DCF 10. Thus, when instructions are received to deliver equipment to a particular venue it is possible to efficiently retrieve the necessary equipment from the warehousing facility.

Figure 5:
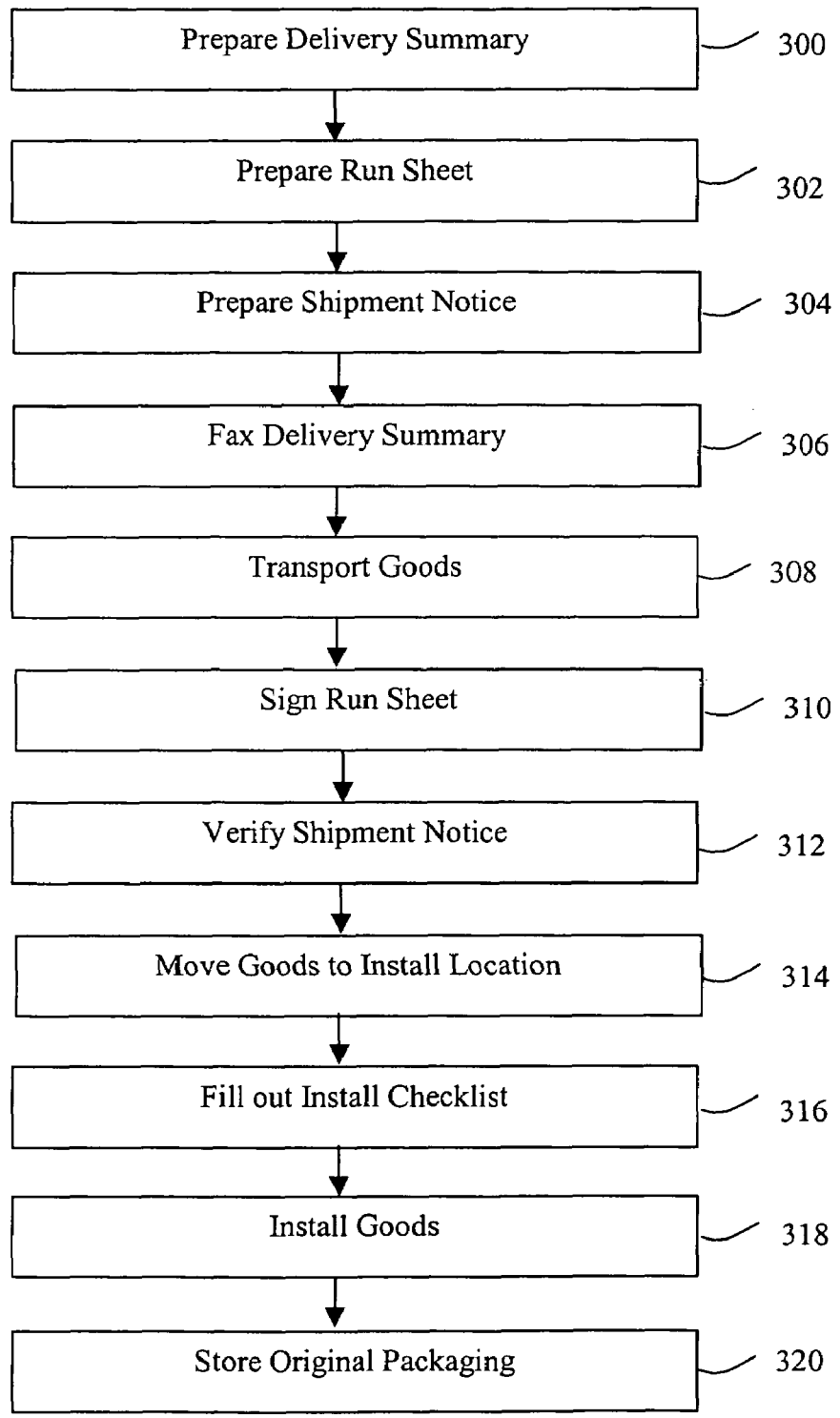
FIG. 5 is a flow diagram describing delivery of assets from a central location to a venue.

FIG. 5 is a flow diagram which shows more detail of the steps involved in delivering equipment to one of the venues 20–23. In steps 300 to 304, three documents are prepared, namely a delivery summary, a run sheet, and a shipment notice. Each of these three documents contains information regarding the equipment which is to be delivered from the DCF 10 to the venue in question. The delivery summary is faxed from the DCF 10 to the venue prior to departure of the shipments (step 306). The delivery summary provides advance notification of all the equipment that is to be delivered. In step 308 the goods are loaded on to the transport and delivered to the venue. The run sheet and shipment notice are sent together with the goods. In step 310 a designated official at the venue signs the run sheet. This comprises the driver's proof of delivery and acknowledges receipt of the total number of assets in the shipment.

In step 312, designated officials at the venue verify the received equipment against the shipment notice and compare against the delivery summary. As noted above, the equipment is separated into "lots" for easier distribution within the venue.

In step 314 the goods are moved to the specific location within the venue where they are to be installed and operated. A member of an install team will check the equipment against a supplied check-list and will unpack, install and test equipment. Typically, the equipment may be divided into network equipment and PC equipment. The network equipment provides an infrastructure for linking the PC equipment in a communications network. Preferably, the network equipment is installed and tested before the PC equipment, as this makes it possible to test operational status and connectivity. In a preferred embodiment, the details stored in the asset tracking system include a unique IP (Internet Protocol) address for each computer system that is to be linked into the communications network.

To allow for ease of reading, identifying tags are placed on the outside of the packaging which contains the computer-related assets. Since the assets will at some stage be returned to the DCF 10, and then possibly be conveyed to different venues, it is desirable to retain the original packaging. Thus in step 320 of a preferred embodiment of the method, the original packaging is stored at a secure location within the venue while the equipment is in use.

Figure 6:
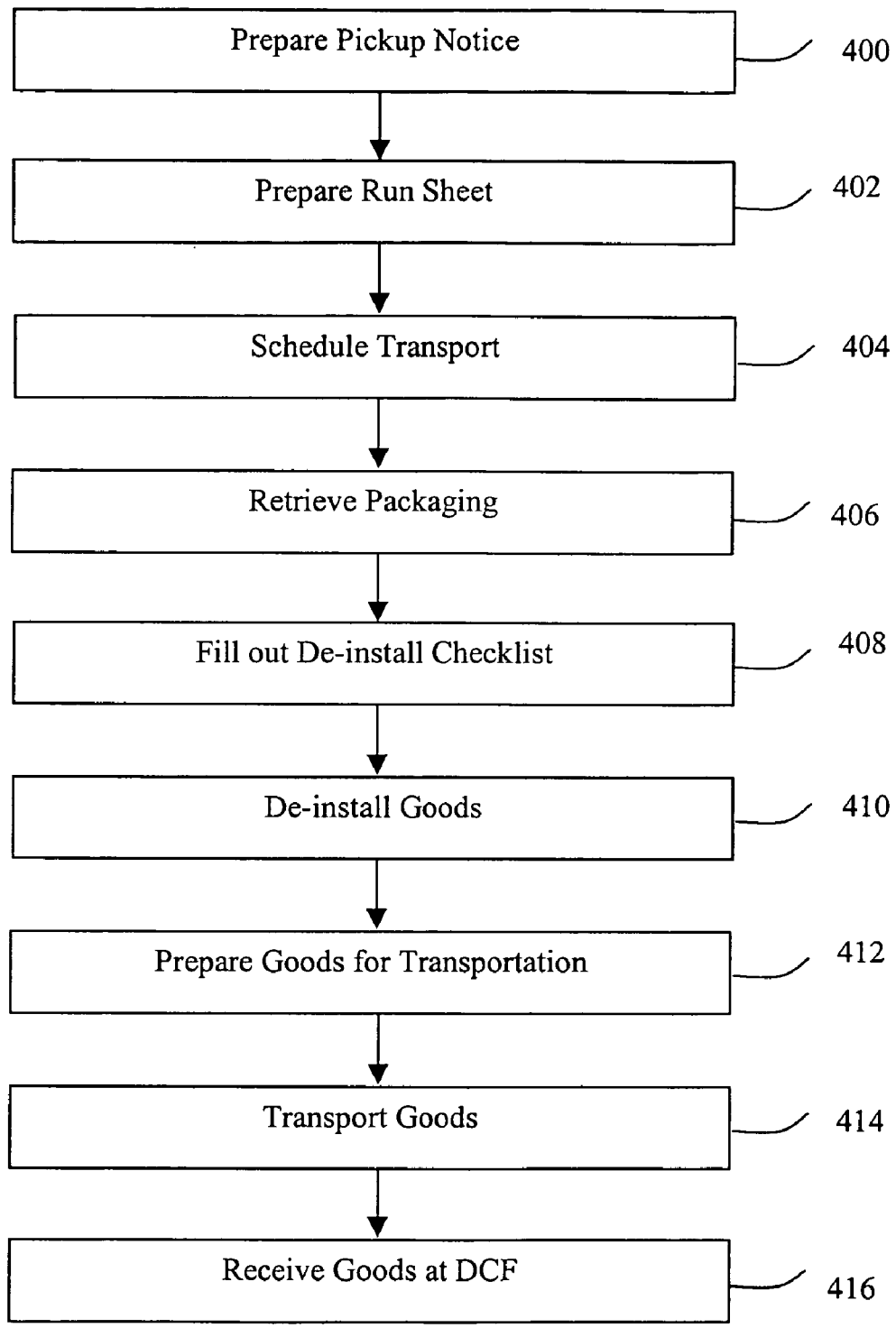
FIG. 6 is a flow diagram describing the return of the assets to the central location.

FIG. 6 is a flow chart which shows in more detail the steps that are followed when assets are returned from one of the venues 20–23 to the Device Configuration Facility 10.

In step 400 a pickup notice is prepared. The pickup notice is based on the shipment notice that was prepared before delivery of the assets to the venue (see step 302). There are potentially some differences between the shipment notice and the pickup notice. Any equipment remaining on site will be marked with the acronym "RAV" (retained at venue). If any additional items are to be shipped that were not included on the original shipment notice, this is to be clearly marked on the pickup notice together with an explanation for the presence of the additional equipment.

In step 402 a run sheet is prepared. This provides the truck driver with a means of confirming the total number of goods to be returned.

A transport run is scheduled (step 404) and the original packaging is retrieved from its storage location (step 406). The de-install team then arrives and checks the state of the goods by filling out a de-install check list (step 408), de-installing the goods (step 410) packing the goods in the original packing and moving the equipment to a loading dock (step 412).

The goods are then transported back to the DCF 10 (step 414) where they pass once again through the goods-receiving process (step 416). In this case all the goods will be of the type VN, i.e. product returned from a venue and thus all the identifying numbers with reference to FIG. 3 are available for capture.

Once the goods have been received at the DCF 10 they will either be re-shelved for future use at a different venue 20–23, or, if they are no longer required, they will be disposed of as appropriate.

The method described above has the ability to track a physical computing asset as it is moved between several venues. This system also tracks the software and hardware configuration of the computing asset together with its unique IP (Internet Protocol) address, its destination and current location and its unique packaging. As the equipment is moved between locations it passes a series of checks at predefined boundary points to ensure accuracy at all times. This system makes it possible to have uniquely configured computers at different locations. It is also possible that the same computing assets may be reconfigured many times to perform different functions at different locations. The described method makes it easier to ensure that the required equipment is delivered on time to the correct venue.

Because the system maintains accurate and detailed records of the location and configuration of computer-related assets, it makes it easier to manage maintenance and stocktaking. The accurate records reduce the risk of equipment loss and ensure the timely detection of any loss that occurs through theft or breakage.

The foregoing describes only one embodiment of the present invention, and modifications and/or changes can be made thereto without departing from the scope and spirit of the invention, the embodiment being illustrative and not restrictive.

I claim:

1. A method for tracking computer-related assets, the method comprising the steps of:

selecting each asset of said assets independently from the group consisting of a computer hardware asset and a computer software asset;

allocating a Software Distribution System (SDS) number associated with a tag;

tagging a first asset of said assets with the tag, said first asset being a computer software asset, said tag comprising an asset tag barcode, a part number or serial number barcode, and the SDS number, said SDS number comprising first, second, and third contiguously sequenced fields, said first field consisting of a venue code identifying a first destination site of the plurality of sites for the first asset, said second field consisting of a software type of the first asset, said third field consisting of a consecutive number index of the software type that makes the first asset unique for the software type at the first destination site;

moving said assets from a first site to a second site of the plurality of sites only by being routed through a central site, said assets are not to be moved directly from the first site to the second site;

recording the location of each said asset with respect to said central site in an electronic database;

recording exit of each asset from a current site in said database;

recording an intended destination site in said database;

receiving the tagged first asset at the destination site, said receiving comprising capturing the asset tag barcode and the SDS number from the tag of the tagged first asset; and verifying, based on the tag, entry of the first asset at the destination site, being a new current location, in said database.

2. The method as claimed in claim 1, comprising the further steps or:
for each asset, recording configuration information relevant to that asset on said database; and
on each configuration of a said asset at said central site, updating said configuration information on said database.

3. The method of claim 2, wherein said configuration information of said assets comprises an IP (Internet Protocol) address.

4. The method of claim 1, including the further step, occurring upon return of an asset to said central site, of determining whether said asset should be retained, and thus stored for further use, or withdrawn from use.

5. The method of claim 1, wherein at least one asset of said assets consists of computer software.

6. The method of claim 1, wherein at least one asset of said assets consists of computer hardware.

7. The method of claim 1, wherein on each movement of said asset the method further comprises faxing a delivery summary from the central site to the intended destination for said asset prior to said exit of said asset from the central site, said delivery summary comprising advance notification that said asset is to be delivered to said intended destination.

8. The method of claim 1, wherein after arrival of said asset at said intended destination the method further comprises installing and testing said asset at said intended destination.

9. The method of claim 1, wherein the first field consists of 3 alphabetical characters, wherein the second field consists of 2 hexidecimal characters, and wherein the third field consists of 2 characters representing an integer.

10. The method of claim 1, wherein the central site comprises a warehouse facility and a build facility, said method further comprising:
storing, by the warehouse facility, individual assets until the individual assets are required to be assembled into computer systems for use at sites of the plurality of sites; and
assembling, by the build facility, the individual assets into the computer systems.

11. The method of claim 10, said method further comprising providing the warehouse facility and the build facility in a same building complex.

12. The method of claim 10, said method further comprising providing the warehouse facility and the build facility in different locations not in a same building complex.

13. The method of claim 10, said method further comprising determining by execution of software whether a given asset of said assets is located at a site or the plurality of sites, in the build facility, in the warehouse, or in transit.

14. A tracking system for computer-related assets, comprising:
an electronic database for storage or current and intended location information relating to said assets, said assets being moveable between a plurality of sites only by being routed through a central site and are not to be moved directly from a first site to a second site of the plurality of sites, each asset of said assets being independently selected from the group consisting of a computer hardware asset and a computer software asset; and
a central receiving and storage site where new assets are received and stored, and where assets returning from other sites are stored, said central site having data entry means, linked to said database and, upon a movement of a said asset, by which exit or entry of the asset is recorded such that both the respective current and intended location information is updated in said database,
wherein a Software Distribution System (SDS) number is associated with a tag,
wherein a first asset of said assets is a computer software asset that is tagged with the tag, said tag comprising an asset tag barcode, a part number or serial number barcode, and a the SDS number, said SDS number comprising first, second, and third contiguously sequenced fields, said first field consisting of a venue code identifying a first destination site for the first asset, said second field consisting of a software type of the first asset, said third field consisting of a consecutive number index of the software type that makes the first asset unique for the software type at the first destination site, and
wherein the tracking system further comprises means for verifying, based on the tap, entry of the first asset at the first destination site, being a new current location, in said database.

15. The tracking system of claim 14, wherein said database stores, for each asset, configuration information relevant to that asset, and said data entry means further updates said database records upon each configuration of an asset.

16. The tracking system of claim 15, wherein said configuration information includes hardware configuration, software configuration and IP address.

17. The tracking system of claim 14, wherein at least one asset of said assets consists of computer software.

18. The tracking system of claim 14, wherein at least one asset of said assets consists of computer hardware.

19. The tracking system of claim 14, wherein the first field consists or 3 alphabetical characters, wherein the second field consists of 2 hexidecimal characters, and wherein the third field consists of 2 characters representing an integer.

20. The tracking system of claim 14, wherein the central site comprises a warehouse facility and a build facility, wherein the warehouse facility stores individual assets until the individual assets are required to be assembled into computer systems for use at sites of the plurality of sites, and wherein the build facility assembles the individual assets into the computer systems.

21. The tracking system of claim 20, wherein the warehouse facility and the build facility are in a same building complex.

22. The tracking system of claim 20, wherein the warehouse facility and the build facility are in different locations not in a same building complex.

23. The tracking system of claim 20, said tracking system further comprises software which, when executed, determines whether a given asset or said assets is located at a site of the plurality of sites, in the build facility, in the warehouse, or in transit.

24. A computer program product, carried on a storage medium, for the tracking of computer-related assets, between a central site and a plurality of sites, comprising:
first program means to record data for each said asset, said assets being moveable between said plurality or sites only by being routed through said central site and are not to be moved directly from a first site to a second site of the plurality of sites, each asset of said assets being independently selected from the group consisting of a computer hardware asset and a computer software asset;

second program means to record the location of an asset;

third program means to record exit from a current site;

fourth program means to record an intended destination; and fifth program means to verify entry of an asset being moved at the destination site, whereupon said second program means updates the current location of the asset, wherein a Software Distribution System (SDS) number is associated with a tag, wherein a first asset of said assets is a computer software asset that is tagged with the tag, said tag comprising an asset tag barcode, a part number or serial number barcode, and the SDS number, said SDS number comprising first, second, and third contiguously sequenced fields, said first field consisting of a venue code identifying a first destination site for the first asset, said second field consisting of a software type of the first asset, said third field consisting of a consecutive number index of the software type that makes the first asset unique for the software type at the first destination site, wherein the fifth program means comprises means for capturing the asset tag barcode and the SDS number from the tag of the tagged first asset to verify, based on the tag, entry of the first asset at the destination site, being a new current location, in an electronic database when the first asset is received at the destination site.

25. The computer program product of claim 24, further comprising:

sixth program means to record and update configuration information for each asset being tracked.

26. The computer program product of claim 25, wherein said configuration information of said assets comprises a software configuration.

27. The computer program product of claim 25, wherein said configuration information of said assets comprises an IP (Internet Protocol) address.

28. The computer program product of claim 24, wherein at least one asset of said assets consists or computer software.

29. The computer program product of claim 24, wherein at least one asset of said assets consists of computer hardware.

30. The computer program product of claim 24, wherein the first field consists of 3 alphabetical characters, wherein the second field consists of 2 hexidecimal characters, and wherein the third field consists of 2 characters representing an integer.

31. The computer program product of claim 30, wherein the central site comprises a warehouse facility and a build facility, wherein the warehouse facility stores individual assets until the individual assets are required to be assembled into computer systems for use at sites of the plurality of sites, wherein the build facility assembles the individual assets into the computer systems, said computer program product further comprising sixth program means to determine whether a given asset of said assets is located at a site of the plurality of sites, into the build facility, in the warehouse, or in transit.

* * * * *

UNITED STATES PATENT AND TRADEMARK OFFICE
CERTIFICATE OF CORRECTION

PATENT NO. : 7,062,455 B1  Page 1 of 1
APPLICATION NO. : 09/657039
DATED : June 13, 2006
INVENTOR(S) : Tobey It is certified that error appears in the above-identified patent and that said Letters Patent is hereby corrected as shown below:

Column 9
Line 53, delete "or" and insert -- of --
Line 57, delete "or" and insert -- of --

Column 10
Line 22, delete "tap" and insert -- tag --
Line 38, delete "or" and insert -- of --
Line 64, delete "or" and insert -- of --

Column 12
Line 10, delete "or" and insert -- of --

Signed and Sealed this

Twelfth Day of September, 2006

JON W. DUDAS
*Director of the United States Patent and Trademark Office*